Figure 1:
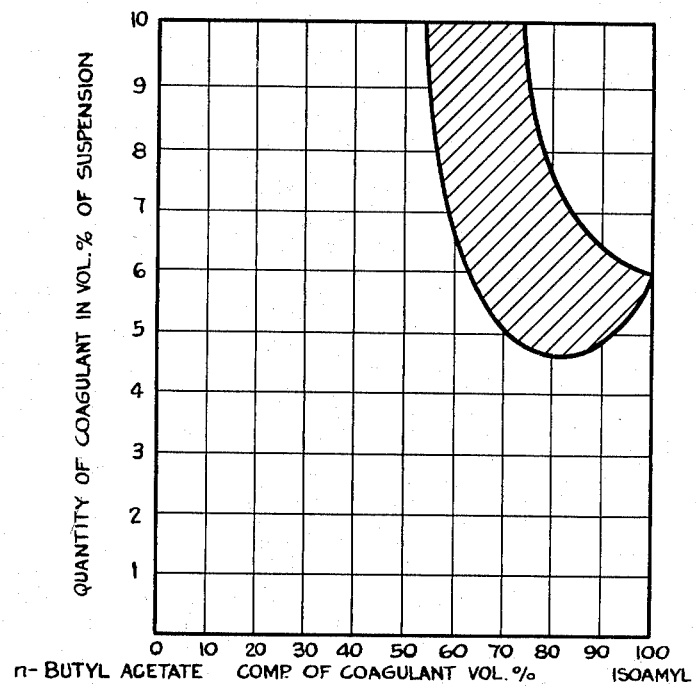
Figure 2:
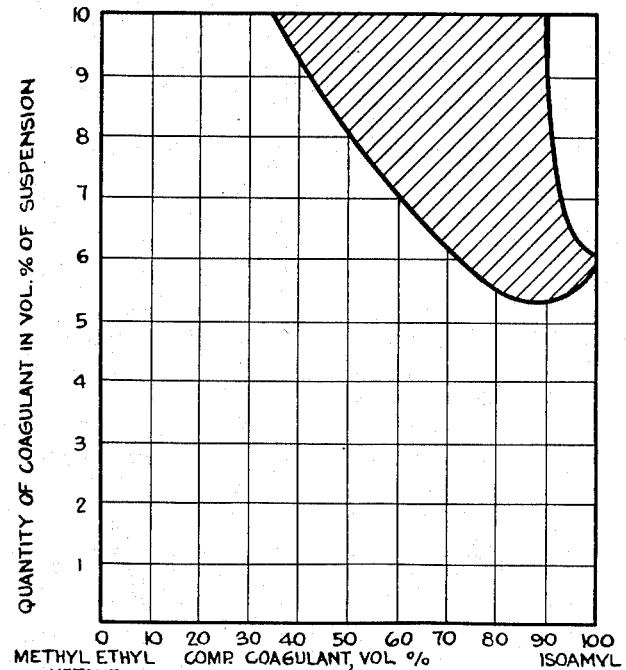

Inventor: Egbert Cornelis Hendrik Kolvoort

Patented Mar. 23, 1954

2,673,193

UNITED STATES PATENT OFFICE 2,673,193

PROCESS FOR COAGULATING POLYMER LATTICES PREPARED IN A TRUE AQUEOUS EMULSION

Egbert Cornelis Hendrik Kolvoort, Amsterdam, Netherlands, assignor to Shell Development Company, Emeryville, Calif., a corporation of Delaware Application August 13, 1951, Serial No. 241,566
In the Netherlands December 13, 1946

Section 1, Public Law 690, August 8, 1946
Patent expires December 13, 1966

10 Claims. (Cl. 260—92.8)

This invention relates to a process for coagulating polymer dispersions. More particularly, the invention relates to a process for coagulating polymer lattices prepared in a true aqueous emulsion.

Specifically, the invention provides an efficient and highly economical process for coagulating stable dispersions of polymers of unsaturated organic compounds prepared in a true aqueous emulsion which comprises adding to the said aqueous emulsion certain organic substances described hereinafter in an amount which is sufficient to form a separate organic phase and heating the resulting mixture, preferably at the boiling temperature of the said mixture.

This application is a continuation-in-part of my application Ser. No. 794,082, filed December 26, 1947, now abandoned.

Aqueous emulsion polymerization presents several advantages over other known polymerization methods, such as bulk and suspension polymerization, and the common monomers such as vinyl chloride, are generally polymerized by this method. The process, however, is not entirely satisfactory, particularly because of the difficulties encountered in finding a suitable method for coagulating the polymer dispersions formed in the emulsion. The methods suggested heretofore for the coagulation of the dispersions include subjecting the emulsion to freezing temperatures, adding an electrolyte, such as sodium chloride, adding a solvent which is entirely miscible with the aqueous phase, such as ethyl alcohol or acetone, and adding the miscible solvent in combination with the electrolyte. The first two methods are generally undesirable because of the high costs involved in their operation and because of the low quality of the resulting polymers. Polymers coagulated with electrolytes generally have high ash contents and are unsuited for many applications, such as in the manufacture of electrical appliances, etc. The coagulation of the dispersions by the addition of the water miscible solvents has the disadvantage of requiring large amounts of the solvent to accomplish the desired degree of coagulation, and in addition requiring considerable time and equipment for recovering the large quantities of solvent employed.

It is, therefore, an object of the invention to provide an improved method for coagulating polymer dispersions. It is a further object to provide an efficient and highly economical method for coagulating polymer lattices prepared in a true aqueous emulsion. It is a further object to provide a method for coagulating polymer lattices prepared in true aqueous emulsion that yields polymers having improved physical properties. It is a further object to provide a method for coagulating polymer lattices that may be accomplished with relatively small quantities of coagulating agents and in a short period of time. It is a further object to provide a method for coagulating polymer lattices in true aqueous emulsions that gives a substantially complete coagulation. It is a further object to provide a method for incorporating a plasticizer with the polymer during the coagulation. Other objects and advantages of the invention will be apparent from the following detailed description thereof.

It has now been discovered that these and other objects may be readily accomplished by the novel process of the invention which comprises adding to the aqueous emulsions containing the dispersed polymer an organic material which is a liquid under the coagulating conditions, is miscible with water in limited proportions only and dissolves very little if any of the polymeric material and is selected from the group comprising alcohols, ketones, acetals, carboxylic acids, ethers, halogenated hydrocarbons, phenol, mixtures thereof, or mixtures of the foregoing compounds and other organic substances indicated hereinafter, in an amount which is sufficient to form a separate organic phase and then heating the resulting mixture, preferably at the boiling temperature of the said mixture. This novel process has been found to bring about a substantially complete coagulation of the dispersed polymers and the resulting polymer particles have greatly improved physical properties, particularly as to mechanical stability and hardness. In addition, the resulting polymer particles have a very low ash content and they are ideally suited for use as an electrical grade polymer. A further advantage of the process lies in the fact that the coagulation may be accomplished by the addition of only relatively small quantities of the coagulating agent and the coagulant that is added can be recovered at the end of the process by distillation without having any serious effect on the color and mechanical properties of the polymer.

The polymer dispersions to be coagulated by the process of the invention are those obtained by homopolymerizing or copolymerizing ethylenically unsaturated organic compounds in a true aqueous emulsion. Examples of such dispersions are those prepared by polymerizing in an aqueous emulsion monomers, such as the unsaturated esters of the saturated monocarboxylic acids, as allyl acetate, vinyl valerate, methallyl caprylate, and ethallyl formate; the unsaturated esters of the unsaturated monocarboxylic acids, such as allyl acrylate, vinyl methacrylate, butenyl crotonate, 4-heptenyl 3-butenoate, and 3-pentenyl sorbate; the unsaturated aliphatic poly-esters of saturated polybasic acids, such as diallyl malonate, allyl ethyl tartarate, and the like; the unsaturated aliphatic polyethers of saturated polyhydric alcohols, such as diallyl and dimethallyl ethers of glycol, diethylene glycol, trimethylene glycerol, and similar derivatives of diglycerol, manitol, sorbitol, and the like; the unsaturated aliphatic organic acid poly-esters of the polyhydric alcohols, such as acrylic and methacrylic poly-esters of glycol; the unsaturated polyesters of dibasic aromatic acids, such as diallyl phthalate, dimethallyl phthalate; the sulfolanyl carbamate, such as methyl 3-sulfolanyl carbamates, and ethyl 3-sulfolanyl (N-methyl) thiocarbamate.

A preferred group of monomers to be polymerized in the aqueous emulsion are those containing a $CH_2=C=$ in their molecule, such as the butadienes, piperylene, isoprene, chloroprene, the aromatic vinyl compounds, such as styrene, alpha-methyl styrene, the nitriles and esters of the acrylic and alpha-substituted acrylic acids, such as methyl methacrylate, acrylonitrile, as well as the vinyl and allyl derivatives of the various acids, ethers, ketones, etc.

Particularly preferred monomers to be polymerized in the emulsion are those possessing a single $CH_2=C=$ group and having a molecular weight of not more than 225, such as vinyl chloride, allyl acetate, vinylidene chloride, methyl methacrylate, styrene, methylstyrene, allyl valerate, vinyl valerate, and the like. An especially preferred group of monomers to be polymerized are the monomers of the group consisting of vinyl chloride, vinylidene chloride, methyl methacrylate and isobutene.

The importance of the invention is particularly in evidence, however, when applied to the coagulation of the homopolymers and copolymers of the vinyl halides, such as vinyl chloride and vinyl bromide.

Any of the emulsifying agents customarily employed in emulsion polymerization of such polymerizable unsaturated organic compounds may be employed. These include particularly the ionic surface active agents, especially those having a polar structure including a hydrophilic (predominantly hydrocarbon) residue and a charged (ionic) radical thereon, such as anionic surface-active compounds including alkali metal and nitrogen-base soaps of higher fatty acids, such as potassium and/or sodium myristate, laurate, palmitate, oleate, stearate, ammonium stearate, etc., as well as the surface-active compounds of the cation-active variety, such as salts of long-chain aliphatic amines and quaternary ammonium bases, such as lauryl amine hydrochloride, stearyl amine, hydrochloride, and palmityl amine hydrobromide. Additional examples of suitable ionic surface-active emulsifying agents include the alkali metal or ammonium alkyl or alkylene sulfates or sulfonates, such as sodium and/or potassium lauryl sulfate, alkyl, aryl and alkylated aryl sulfonates, cetyl sulfonate, oleyl sulfonate, stearyl sulfonate, sulfonated Turkey red oil, sulfonated mineral oils, sodium, potassium and ammonium isopropyl naphthalene sulfonate, amine soaps, such as triethanolamine stearate, amino-substituted alcohols, sulfonated fatty esters and amides, the hydrochloride of diethyl aminoethyl-oleylamide, trimethylcetyl ammonium methyl sulfate, alkanesulfonic acids, alkali metal and ammonium salts of sulphonated long-chain hydrocarbons, or sulphonated long-chain fatty acids, such as sulphonated oleic acid and the sodium, potassium and ammonium salts of sulphated cetyl alcohol. Starch, gum-arabic, the polyoxyalkylene oxide condensates of hexitan anhydrides, carboxymethylcellulose, etc. may also be used. These emulsifying agents are organic-solvent stable and as a whole alkali stable; that is unlike, for example, proteins, they are not chemically altered upon solution or dispersion in organic solvents and are generally stable in the presence of alkali, such as aqueous solutions of caustic alkali. Proteins as a group are not organic-solvent stable or alkali-stable.

The amount of the emulsifying agent employed in the preparation of the stable emulsions will vary over a considerable range depending upon the particular unsaturated organic compound to be polymerized, the type of emulsifying agent, the amount of water, and the kind and amount of other ingredients added thereto. In general the amount will vary from about .1% to about 10% by weight of the water present in the reaction medium. The preferred amount of the emulsifying agent to be employed will vary between about .5% and about 5% by weight of the water present in the reaction medium.

The aqueous emulsion in which the polymer dispersion is prepared may be acid, alkaline or neutral. As the subsequent coagulation process is preferably accomplished in an alkaline medium, it is generally preferred to conduct the polymerization in an alkaline emulsion, i. e. an emulsion that has a pH of at least 7, so that there will be no need to subsequently adjust the pH of the solution for the coagulation. The pH of the original emulsion may be brought to the desired level by the addition of any suitable agent, such as NaOH, and the like.

The polymerization may be effected in the aqueous emulsion by the application of heat, light and polymerization catalysts, or any desired combination thereof. Any of the known polymerization catalysts, such as the per-acids, such as persulfuric acid, peracetic acid, and perphthalic acid, the per-salts, such as potassium persulfate, the peroxide catalysts, such as hydrogen peroxide, benzoyl peroxide, succinyl peroxide, lauryl peroxide, dibutryl peroxide, sodium peroxide, tert-alkyl hydroperoxides, such as tert-butyl hydroperoxide, and the like, may be used with success in the polymerization. If desired, mixtures of the catalysts may be employed. The amount of the catalyst employed may vary over a considerable range depending upon the various conditions of reaction. In most cases, the amount of catalyst will vary between about .01% to about 5% by weight of the material to be polymerized. A preferred amount of catalyst will vary between .01% to 2% by weight.

The total amount of the polymerizable material to be added to the aqueous emulsion may vary over a considerable range depending upon the nature of the various ingredients and the amount of water present in the emulsion. In most cases it is preferred to maintain the ratio of polymerizable material to water smaller than 1 to 2. When the ratio is larger than 1 to 2 the emulsion, in some cases, becomes too thick to be handled efficiently and the results are not as satisfactory as desired. The preferred ratio of the polymerizable material to the water in the emulsion mixture varies between about 1 to 3 and 1 to 5.

Temperatures employed during the aqueous emulsion polymerization will, in most cases, vary between about 30° C. to about 80° C. with a preferred range being between about 40° C. to about 60° C. Atmospheric pressure is usually the preferred pressure to be employed.

The polymer dispersions prepared in the true aqueous emulsions are coagulated according to the process of the invention by the addition of an organic substance as described above in sufficient quantity to form a separate organic phase and then heating the resulting mixture, preferably at the boiling temperature of the said mixture. The materials used as coagulating agents are those organic substances that are liquid under the coagulating conditions, are miscible with water in limited proportions only and dissolve very little if any of the polymeric material and are selected from the group comprising alcohols, ketones, acetals, carboxylic acids, ethers, halogenated hydrocarbons, phenol, mixtures thereof, or mixtures of the foregoing compounds and other organic substances described hereinafter.

The organic substances used as the coagulating agents should have at least some solubility in water but the solubility should be limited. The solubility of the material may vary, for example, from .01 to 18 parts per 100 parts of water at the coagulating temperature or from 0.1 to 10 parts per 100 parts of water at the coagulating temperature. Preferably, the solubility of the coagulating agent varies from the solubility of diamyl ether in water at the coagulating temperature to the solubility of methyl ethyl ketone in water at the coagulating temperature.

The organic substances used as the coagulating agents should also dissolve very little if any of the polymer to be coagulated. The solubility of polymer in the coagulating agent may vary, for example, from no solubility to from 5 or 10 parts per 100 parts of agent at the coagulating temperature. Preferably, the solubility of the polymer in the agent varies from no solubility to the solubility of the polymer in methyl ethyl ketone at the coagulating temperature.

The coagulating agents should also be liquid at the coagulating temperature and selected from the above-described special types of materials that possess the necessary substituted groups. Examples of such compounds are butyl alcohol, the amyl alcohols, particularly isoamyl alcohol, the hexyl alcohol, particularly sec-hexyl alcohol, methyl isobutyl carbinol, benzyl alcohol, methyl ethyl ketone, isobutyl ketone, mesityl oxide, diethyl acetal, isobutyric acid and valeric acid, diethyl ether, diisopropyl ether and diamyl ether, trichloroethane and allyl chloride, and phenol, and mixtures thereof.

A preferred group of coagulants are the alcohols, ketones, ethers and acids containing from 3 to 12 carbon atoms and preferably from 5 to 9 carbon atoms, such as amyl alcohol, isoamyl alcohol, hexyl alcohol, sec-hexyl alcohol, methyl isobutyl carbinol, octyl alcohol, valeric acid, enanthic acid, methyl butyl ketone, diamyl ether, and the like.

Particularly preferred coagulating agents are the alcohols and acids, and particularly the aliphatic alcohols and acids, containing from 4 to 6, and more preferably from 5 to 6 carbon atoms, such as amyl alcohol, isoamyl alcohol, sec-amyl alcohol, methyl isobutyl carbinol, hexyl alcohol, isohexyl alcohol, valeric acid, and the like.

It has also been unexpectedly found that other substances that by themselves do not give the desired coagulating action can be mixed with the aforedescribed agents to produce compositions having excellent coagulating power. The resulting mixture of course should possess the above-described properties of being miscible with water to a limited extent only, of being a liquid under the coagulating conditions, and of dissolving very little if any of the polymeric material. Hydrocarbons are particularly important additives to be mixed with the above-described substances. Examples of such hydrocarbons are gasoline, hexane, isooctane, cyclohexane, methylcyclohexane, toluene, benzene, and the like.

Another important group of organic substances that do not by themselves give the desired coagulation but can be added to the above-described agents to produce mixtures having excellent coagulating power are those organic compounds which will have a plasticizing effect on the resultant polymeric material. Examples of such plasticizers which may be admixed with the coagulants are butyl acetate, dibenzyl phthalate, dioctyl phthalate, dibenzyl succinate, cyclohexyl acetate, butoxyethyl tetrahydrofuroate, sulfonamides, diethylene glycol dibutyrate, ethoxyethyl sebacate, triacetin, triamyl phosphate, tricresyl phosphate, dibutyl phthalate, triphenyl phosphate, and the like. Preferred plasticizers to be used are those possessing at least one ester group in their molecule. When these and other plasticizers are utilized in the coagulant there appears to be a very uniform distribution of the said plasticizer throughout the polymeric particles that are formed and they in turn are very easily worked up per se or with other plasticizers to form the desired articles.

The amount of the above-described materials that may be added with the special coagulating agents and still obtain the desired coagulation will vary with the individual components and can easily be determined by conducting a few routine determinations.

Exceptionally fine results are obtained in the process of the invention when the coagulant used is an alcohol, and preferably one of the preferred alcohols containing from 5 to 9 carbon atoms, and at least one other organic substance, such as the liquid hydrocarbons and plasticizers described above. Examples of such coagulants which may be used to produce the exceptionally fine results are mixtures of isoamyl alcohol and n-butyl acetate, isoamyl alcohol and gasoline, isoamyl alcohol and methyl ethyl ketone, hexyl alcohol and methyl ethyl ketone, isoamyl alcohol and mesityl oxide, isoamyl alcohol and isobutyl ketone, isoamyl alcohol and dichloro-ethane, octyl alcohol and isobutyl ketone, isoamyl alcohol and cyclohexane, isoamyl alcohol and trichloroethene, decyl alcohol and dichloroethane, and the like. Examples of mixtures having three or more components include mixtures of isoamyl alcohol-butyl acetate-dichloroethane, isobutyl alcohol-isoamyl alcohol-dichloroethane, and isobutyl alcohol-isoamyl alcohol-butyl acetate. When the three component mixtures are employed, they generally produce coagulates that are much coarser than those obtained with the binary mixtures.

The amount of the coagulating agent employed in the process should be sufficient to form an essential separate organic phase in the resulting mixture and preferably not substantially in excess of that amount. The amount of the coagulant required for the formation of this layer will vary with each particular case depending upon the solubility of the coagulants in the aqueous medium, the temperature of reaction, etc. and may best be determined for each individual situation.

It has been found to be of advantage to conduct the coagulation so that there will always be a clear aqueous phase left behind. When this occurs, the coagulation is obtained to a much higher degree, the products are more easily filtered, and the coagulate possesses improved mechanical properties. The clear aqueous phase can be obtained by keeping the quantity of the coagulating agent at the end of the coagulation within certain predetermined narrow limits in proportion to the quantity of the dispersion. This may be accomplished by adding the desired amount of coagulating agent at the beginning of the process, or alternatively, by adding at the beginning a greater quantity of agent than is desirable or essential to obtain the desired effect and then after the coagulation removing part of the agent, particularly by distilling the reaction mixture. When in distilling the mixture the point is reached that the aqueous phase, after the settling, would be clear or practically clear, the distillation may be continued without detriment to the effect already attained. A clear aqueous layer, for example, is obtained when coagulating poly (vinyl chloride) by the addition of 6 vol. per cent of isoamyl alcohol, or alternatively, by adding much larger quantities, e. g. 10 vol. per cent and then after the coagulation removing the isoamyl alcohol by distillation until the minimum value has been reached or surpassed.

In case the coagulant utilized in the process of the invention is composed of a mixture of organic substances, e. g. the above-described preferred mixture of an alcohol and at least one other organic substance, the desired clear aqueous phase is obtained by maintaining the ratio of the components in the mixture within certain limits and by keeping the ratio of the amount of the separate phase formed by the coagulant and the amount of the dispersion above a certain minimum value and also preferably less than a certain maximum value.

The limits of the ratios referred to above are dependent on various factors. Moreover the limits of each of the ratios mentioned are dependent on the value of the other ratio. For each separate case the suitable values can be determined experimentally. The relation between the ratios can best be illustrated by the use of graphs such as those described in the examples at the end of the specification wherein the ratios of the components in the coagulant are plotted against the amount of the coagulant in the suspension.

When using mixtures of components as the coagulating agent, it is also possible to obtain the clear water phase by first adding a greater quantity of the mixture than is desirable or essential for obtaining the desired favorable effect and then after the coagulation, removing the coagulating agent until it reaches the minimum value. In this case also, the lower value may be exceeded in the removal without the water phase becoming turbid.

The amount of polymer dispersed in the aqueous emulsion may vary over a wide range. The preferred solutions to be employed are those having from 15% to 33% by weight and more preferably from 15% to 30% by weight of the polymer dispersed therein. More concentrated dispersions are preferably diluted with water before being treated. Greater concentrations or smaller concentrations than the above may of course be treated if desired or necessary.

The aqueous emulsion to be used in the coagulation process may be acid, neutral or alkaline. The coagulation is preferably carried out in a medium that is neutral or alkaline, i. e. a solution having a pH of at least 7. A neutral to weakly alkaline emulsion is particularly preferred.

The mixture comprising the polymer dispersion and the coagulating agent is heated in order to bring about the desired coagulation (see Example Ib). The aqueous dispersion may be heated before addition of the coagulating agent or the agent may be added to the dispersion and the combined mixture then brought to the desired temperature. The mixture is preferably heated above at least 50° C., and still more preferably at 100° C. or the boiling temperature of the said mixture. An especially preferred range varies from 90° C. to 100° C. The length of the heating period will vary with the temperature employed and the particular polymer to be coagulated but in most cases should not be more than 40 to 50 minutes, and preferably from 5 to 10 minutes.

It is generally desirable to accomplish the coagulation in as short a period as possible after the addition of the agent so as to prevent any substantial adsorption of the coagulating agent on the polymer particle that may possibly occur in a few instances.

The dispersed polymer will begin to coagulate during the heating period and at the conclusion thereof will settle to the bottom as more or less round, hard and readily filterable particles of about equal size. The coagulate may be removed from the reaction medium by any suitable method, such as filtration and the like.

Volatile coagulating agents may readily be recovered by distillation at the end of the process. They may be recovered from the total mixture before the coagulate has been separated or they may be recovered from the mixture after the coagulate has been removed. It is desirable in most cases to remove the coagulating agent during the washing of the polymer pulp as it is more readily separated at that time from the coagulate. As indicated a valuable advantage of the process of the invention is the fact that the mixture containing the coagulating agent and the coagulate may be subjected to distillation without danger of causing any discoloration of the polymer particles.

The process of the invention may be conducted under atmospheric, subatmospheric or superatmospheric pressure. Atmospheric pressure is preferred. The process may also be conducted in a batch-wise, semi-continuous or continuous manner.

The coagulated particles obtained by the process of the invention will have exceptionally fine mechanical stability as shown by their resistance to rapid stirring, and in addition, have a very low ash content, i. e. a low amount of ash-forming constituents, such as emulsifier, catalyst residue and inorganic salts. The coagulates may readily be worked up in a very smooth manner with any of the known plasticizing agents at room temperatures or higher temperatures. This characteristic is of particular importance as the smooth combination of the polymeric particles with the plasticizers at the higher temperatures enables one to mill the components together without having any serious action on the color or mechanical properties of the final product.

The coagulates may readily be molded, cast into sheets, rods, tubes, and the like of any desired shape or size. They may also be subjected to extrusion and to injection and compression molding in the presence or absence of added diluents. They may also be utilized in solvent solution in the production of surface coatings, impregnating agents, laminating solutions, and the like. The coagulates are of particular importance, due to their exceptionally fine electrical properties, in the manufacture of electrical equipment, insulations and the like.

To illustrate the manner in which the invention may be carried out the following examples are given. It is to be understood, however, that the examples are for the purpose of illustration only and they are not to be regarded as limiting the invention in any way.

Example I (a) An aqueous suspension of polyvinyl chloride was prepared by polymerizing monomeric vinyl chloride in an aqueous emulsion of pH 8-9, 2 parts of sodium cetyl sulfate as emulsifying agent, and 1 part of potassium persulfate as the catalyst. About 200 parts of this suspension which contained about 33% by weight of polyvinyl chloride was diluted with 75 parts of water and mixed with about 27.5 parts of technical iso-amyl alcohol (boiling point 126-131° C.). The mixture was boiled for 5 minutes under a reflux condenser and subsequently filtered through a Buchner funnel with filtering paper. The filter cake was washed four times with water at about 50° C. and dried in vacuo at about 50° C. An analysis of the cake showed an ash content of between 0.1 to 0.2%. The color of the product was very light.

(b) Another suspension was prepared by polymerizing vinyl chloride in an aqueous emulsion of pH 8-10 with sodium lauryl sulfate as the emulsifying agent. About 200 parts of this suspension was diluted with water as in (a) and then about 27 parts of technical isoamyl alcohol added and the mixture allowed to stand without any heat being applied. There was no noticeable coagulation of the polymer dispersion and it was necessary to heat the resulting mixture, particularly to at least about 50° C. before the desired coagulation was obtained.

Example II

About 50 parts of the aqueous emulsion described in Example I was diluted with about 25 parts of water after which about 40 parts of diethyl acetal was added. The mixture was heated up to boiling for 5 minutes and was then easily filtered. After several washings the cake was dried at 50° C. The powder was then mixed with tricresyl phosphate and turned into films, some of which are pressed together, the temperature being raised to 160° C. in 3 minutes and maintained at that level under constant pressure for another three minutes. The resulting product is a clear, colorless, flexible compressed sheet possessing excellent electrical properties.

Example III

About 350 parts of the emulsion described in Example I was diluted with 175 parts of water and then heated up to boiling. Then 55 parts of secondary hexyl alcohol was added. After a few minutes boiling the mixture was cooled to about 80° C. and filtered. Further treatment as in Example I yielded a colorless product with an ash content to 0.27%.

Example IV

The following table shows the results obtained when samples of 33% polyvinyl chloride suspensions as prepared in Example I were treated with the coagulants as indicated:

| Water (ml.) | Coagulant (type) | Coagulant (quantity) | Coagulation |
|---|---|---|---|
| 25 | trichloroethane | 5 | Complete. |
| 25 | methyl ethyl ketone | 7.5 | Do. |
| 25 | mesityl oxide | 25 | Do. |
| 25 | oleic acid | 25 | Do. |
| 25 | diamyl ether | 5 | Do. |
| 25 | sec-heptyl alcohol | 15 | Substantially complete. |
| 25 | sec-octyl alcohol | 20 | Do. |
| 25 | sec-nonyl alcohol | 7.5 | Complete. |
| 25 | sec-hexyl alcohol | 15 | Do. |

The coagulates in each case were readily filtered and dried to cakes having very low ash content.

Example V

About 200 parts of the suspension prepared according to Example I was neutralized with HCl to a pH of 7. Then 8 parts of isoamyl alcohol and 12 parts of gasoline (boiling point 100° C. to 120° C.) were added. The mixture was heated to boiling for 5 minutes and then filtered. Further treatment as outlined in Example I gave a colorless product having an ash content of 0.25%.

Example VI

About 200 parts of a suspension of 30% by weight of polyvinyl chloride prepared at a pH of 2.5 in the aqueous phase with about 2 parts of sodium cetyl sulfate as emulsifying agent and .4 part of hydrogen peroxide as catalyst was neutralized by the addition of NaOH. About 8 parts of isoamyl alcohol and 12 parts of gasoline (boiling point 100 to 120° C.) were then added and the mixture was kept at 50° C. for 1 hour. Further treatment as described in the preceding examples yielded a product with ash content of 0.3%. The dried powder is combined with tricresyl phosphate and cured at about 160° C. for a short period of time. The resulting product was a hard, flexible sheet, having excellent electrical properties.

Example VII

About 50 parts of the suspension prepared as in the preceding example was neutralized and 5 parts of isoamyl alcohol added. After heating up to boiling for a few minutes the coagulation product was readily filtered. Further treatment as mentioned in Example I, yielded an almost colorless product with a very low ash content.

Results comparable with those obtained in the above examples were produced with dispersions of polymers of vinlyidene chloride, methyl methacrylate, and isobutene, and copolymers of vinyl chloride with vinylidene chloride and copolymers of vinylidene chloride and isobutene.

Example VIII 30 parts of methyl isobutyl carbinol was added to 300 parts of a 20% by weight of an aqueous suspension of polyvinyl chloride which had been prepared at a pH of 8 in the water phase with 2 parts of sodium cetyl sulphate as the emulsifier. The mixture was boiled for 15 minutes with a reflux condenser and then filtered with filtering paper. The filtrate was clear. The filter cake was washed several times with water and then dried. The resulting product was light in color and had an ash content of 0.2%.

Example IX

About 300 parts of the suspension prepared as in the preceding example was combined with 30 parts of methyl isobutyl carbinol and 10 parts of dichloroethane. The resulting mixture was then boiled for 20 minutes. An azeotropic mixture of methyl isobutyl carbinol, dichloroethane and water was then distilled off (94–95° C.). The remaining mixture was filtered. The filtrate obtained was clear. After washing and drying, the resulting product had an ash content of 0.2%.

Example X

A 20% suspension of polyvinyl chloride was prepared by polymerizing the monomeric vinyl chloride in an aqueous emulsion with sodium cetyl sulfonate as the emulsifier, potassium persulfate as a catalyst, and a pH of 8 to 9 at a temperature of about 35° C. The suspension was diluted with half its volume of water and about 3 parts of sodium bicarbonate per 1000 parts of the total mixture was added in order to keep the pH at a sufficient level.

Approximately 6 vol. percent of isoamyl alcohol (calculated on the total volume of the suspension before the addition of the alcohol), was added to the suspension mixture. The mixture was then kept at boiling temperature for 5 minutes.

After settling of the coagulate a clear top aqueous phase was obtained. Upon addition of larger as well as smaller quantities of the isoamyl alcohol and aqueous phase remained turbid. The coagulate was very easily filtered to give a cake made up of particles of uniform size.

Example XI

A suspension of polyvinyl chloride was prepared as in the preceding example. 10 vol. percent of isoamyl alcohol was added and the mixture treated as above. When the mixture was centrifuged the top aqueous layer remained turbid.

Different results were obtained, however, if after coagulation 7.5 vol. percent of the isoamyl alcohol was distilled off. In this case, after centrifugation the aqueous phase was perfectly clear.

Example XII

A suspension of 20% polyvinyl chloride was prepared by polymerizing monomeric vinyl chloride in an aqueous emulsion with sodium cetyl sulfonate as the emulsifier, potassium persulfate as the catalyst, and a pH of about 8 to 9 and a temperature of 35° C. The suspension was diluted with half its volume of water, 3 parts of sodium bicarbonate per 1000 parts of mixture was added in order to maintain the pH at the desired value.

Mixtures of isoamyl alcohol and n-butyl acetate in varying ratios were then added to individual suspensions as prepared above in varying proportions. The resulting mixtures were then heated at boiling for about 5 minutes.

The results are shown in Figure I. In the graph, the composition of the coagulant is plotted against the vol. percent of the coagulant calculated on the volume of the water-diluted suspension. Each of the points in the hatched area correspond with the ratios which bring about a clear upper layer after the coagulate has settled. Points lying outside the area relate to less favorable coagulation circumstances wherein the water phase is turbid after the settlement of the coagulate.

Example XIII

A series of experiments were conducted as in the preceding example with the exception that the coagulant consisted of mixtures of isoamyl alcohol and methyl ethyl ketone. The results of these experiments are shown in Figure II. Each of the points in the hatched area indicate the ratios which being about a clear upper layer after the coagulate has settled and the points outside indicate the ratios that will give a turbid upper layer.

Similar diagrams occur when replacing isoamyl alcohol with other alcohols and by replacing the n-butyl acetate or methyl ethyl ketone with the following components; tricresyl phosphate, dibutyl phthalate, dioctyl phthalate, isobutyl ketone, mesityl oxide, dichloroethane, trichloroethane and chlorinated diphenyl, ethers, acetals and other organic substances. In a great number of cases the area favorable to the intended effect has a shape corresponding to some extent with the hatched areas in the accompanying graphs. Generally, the suitable area is bounded by two curves intersecting the axis of ordinates at a fairly close distance from each other. The lower limit mostly shows a minimum value. In some cases the rising branches of the two curves tend to run almost parallel to the axis of the ordinates as in Figure I. In many other cases, the rising branches of the curves are divergent as in Figure II.

In the following table, the approximate coordinates are listed of various minima found in the coagulation of the above-described suspension.

| Alcohol | Other components of coagulant | Ratio between volumes of alcohol and other component of coagulant | Percent by vol. of coagulant calculated on water-diluted dispersion |
|---|---|---|---|
| isoamyl alcohol | methyl ethyl ketone | appr. 90:10 | appr. 5.3. |
| Do | mesityl oxide | appr. 90:10 | appr. 4.6. |
| Do | isobutyl ketone | appr. 90:10 | appr. 5.6. |
| Do | dichloro-ethane | appr. 90:10 | appr. 5.9. |

The coagulates obtained in the above-described experiments were characterized by their excellent mechanical stability. The mechanical stability was judged by their resistance to stirring, the criterion being the clearness of the top layer of the vigorously stirred and subsequently centrifuged coagulated suspension. Stirring was effected with an L-shaped stirrer at approximately 1000 revolutions per minute. After the mixture was centrifuged, the clearness of the top was examined after 1, 3 and five minutes of stirring. In various cases, the top layer was still entirely clear after being subjected to 5 minutes' intense stirring and centrifugation.

while the microscopic picture of the coagulate had remained practically unchanged so that no diminution of the particle size could be observed.

The resistance to stirring is found to be dependent on the nature of the organic substance added with the alcohol, on the ratio of these components in the coagulant and the volumetric ratio of coagulant to dispersion. It was found, for example, that in the above series of experiments wherein the coagulant was a mixture of isoamyl alcohol and methyl ethyl ketone, those mixtures having the alcohol and ketone in ratio varying between 90:10 and 35:65 and the amount of coagulant remained at 10%, were able to produce coagulates having a resistance to the 3 minute stirring.

*Example XIV*

The suspension of poly(vinyl chloride) produced in Example X was coagulated by the addition of a mixture of 10% by volume of isoamyl alcohol and 5.8% by volume of tricresyl phosphate and heating the mixture to boiling for 5 minutes. After evaporation of the isoamyl alcohol, filtration and washing, the poly(vinyl chloride) was obtained as a fine powder. The powder was then rolled for 3 minutes at 155° C. and molded at 160° C. for 3 minutes. The resulting product was a clear, colorless, flexible sheet which was still found to contain the entire quantity of the tricresyl phosphate applied.

*Example XV*

Different aqueous suspensions were prepared and treated with isoamyl alcohol as the coagulant and the resulting mixture heated to boiling. The results are indicated in the table below:

| Monomers | Percent Monomers | Percent Emulsifier | Percent Catalyst | pH | Coagulation |
|---|---|---|---|---|---|
| butadiene | 25 | 10 | .5PS | 8 | good. |
| copolymer of vinyl chloride and vinylidene chloride. | 15 and 10 | 10 | .45PS | 8 | Do. |
| methyl methacrylate | 25 | 10 | .5PS | 8 | Do. |

P—Potassium persulphate.
S—Sodium sulphite.

*Example XVI*

A suspension of a copolymer of vinyl chloride and vinylidene chloride is treated with a series of coagulants as indicated below and then heated to boiling. The results are indicated below:

| Water, ml. | Coagulant | ml. | Coagulation |
|---|---|---|---|
| 25 | sec-hexyl alcohol | 20 | Substantially complete. |
| 25 | methyl ethyl ketone | 20 | Do. |
| 25 | oleic acid | 25 | Complete. |

I claim as my invention:

1. A process for coagulating a stable latex of a vinyl chloride polymer which latex has a pH of at least 7 and has been prepared by polymerizing the said vinyl chloride in a true aqueous emulsion containing water, the vinyl chloride and, as the sole emulsifying agent, from 0.5% to 5% by weight based on the water of an ionic surface active agent which is organic solvent stable and alkali stable, which comprises adding to the said latex a coagulating agent of the group consisting of alcohols containing from 3 to 12 carbon atoms, mixtures of the said alcohols with ketones containing from 3 to 12 carbon atoms, and mixtures of the said alcohols with liquid hydrocarbons wherein the said coagulating agent is a liquid at the coagulating temperature and has a solubility in water at the coagulating temperature varying from the solubility of diamyl ether to the solubility of methyl ethyl ketone at the coagulating temperature and the solubility of the polymer in the said coagulating agent at the coagulating temperature does not exceed that of the solubility of the polymer in methyl ethyl ketone at the coagulating temperature, in an amount which is sufficient to form a separate organic phase and heating the mixture of aqueous dispersion and added coagulating agent at a temperature at least about 50° C. to bring about the coagulation of the dispersed polymer.

2. A process for coagulating a stable neutral to alkaline latex of a vinyl chloride polymer which latex has been prepared by polymerizing the said vinyl chloride in a true aqueous emulsion containing water, the vinyl chloride and, as the sole emulsifying agent, from 0.5% to 5% by weight based on the water of an ionic surface active agent which is organic solvent stable and alkali stable, which comprises adding to the said latex a coagulating agent of the group consisting of alcohols containing from 3 to 12 carbon atoms, mixtures of the said alcohols with ketones containing from 3 to 12 carbon atoms, and mixtures of the said alcohols with liquid hydrocarbons wherein the said coagulating agent is a liquid at the coagulating temperature and has a solubility in water at the coagulating temperature varying from the solubility of diamyl ether to the solubility of methyl ethyl ketone at the coagulating temperature and the solubility of the polymer in the said coagulating agent at the coagulating temperature does not exceed that of the solubility of the polymer in methyl ethyl ketone at the coagulating temperature, in an amount sufficient to form a separate organic phase and then heating the resulting mixture to boiling for a few minutes to bring about the coagulation of the dispersed polymer.

3. A process for coagulating a stable weakly alkaline latex of a vinyl chloride polymer which latex has been prepared by polymerizing the vinyl chloride in a true aqueous emulsion containing water, the vinyl chloride and, as the sole emulsifying agent, from 0.5% to 5% by weight based on the water of an ionic surface active agent which is organic solvent stable and alkali stable, which comprises adding to the said latex a coagulating agent consisting of an alcohol containing from 3 to 12 carbon atoms wherein the said coagulating agent is a liquid at the coagulating temperature and has a solubility in water at the coagulating temperature varying from the solubility of diamyl ether to the solubility of methyl ethyl ketone at the coagulating temperature and the solubility of the polymer in the said coagulating agent at the coagulating temperature does not exceed that of the solubility of the polymer in methyl ethyl ketone at the coagulating temperature, in an amount which is in excess of that which is sufficient to form a separate organic phase, heating the resulting mixture to boiling for a few minutes to bring about coagulation of the polymer, and then distilling off a portion of the said coagulating agent so that the aqueous layer is clear.

4. The process as defined in claim 3 wherein the coagulating agent is isoamyl alcohol.

5. A process for coagulating a stable emulsion containing 15% to 33% by weight of a polymer of vinyl chloride dispersed therein which emulsion has been prepared by polymerizing the monomer in alkaline true aqueous emulsion containing water, the monomer and as the sole emulsifying agent from 0.5% to 5% by weight based on the water of an ionic surface active agent which is organic solvent stable and alkali stable, which comprises adding to the said emulsion a coagulating agent of the group consisting of alcohols containing from 3 to 12 carbon atoms, mixtures of the said alcohols with ketones containing from 3 to 12 carbon atoms, and mixtures of the said alcohols with liquid hydrocarbons wherein the said coagulating agent is a liquid at the coagulating temperature and has a solubility in water at the coagulating temperature varying from the solubility of diamyl ether to the solubility of methyl ethyl ketone at the coagulating temperature, and the solubility of the polymer in the said coagulating agent at the coagulating temperature does not exceed that of the solubility of the polymer in methyl ethyl ketone at the coagulating temperature, in an amount which is sufficient to form a separate organic phase and then heating the resulting mixture to boiling for a few minutes to bring about the coagulation of the dispersed polymer.

6. The process as defined in claim 5 wherein the coagulant is secondary hexyl alcohol.

7. The process as defined in claim 5 wherein the coagulant is a mixture of isoamyl alcohol and methyl ethyl ketone.

8. The process as defined in claim 5 wherein the coagulant is a mixture of isoamyl alcohol and gasoline having a boiling range of 100–120° C.

9. A process for coagulating a stable emulsion containing about 15% to 33% by weight of a vinyl chloride polymer prepared by polymerizing the monomer in an aqueous emulsion having a pH of 7 to 9 and containing as the sole emulsifying agent a member of the group consisting of an alkali metal alkyl sulfate and alkali metal alkyl sulfonate which comprises adding about 6 vol. percent of isoamyl alcohol which amount is sufficient to form a separate organic phase and then heating the resulting mixture to boiling to bring about the coagulation of the vinyl chloride polymer.

10. A process for coagulating a stable emulsion containing about 15% to 33% by weight of a vinyl chloride polymer prepared by polymerizing the monomer in an aqueous emulsion having a pH of 7 to 9 and contains as the sole emulsifying agent a member of the group consisting of an alkali metal alkyl sulfate and alkali metal alkyl sulfonate which comprises adding approximately 10 vol. percent of isoamyl alcohol which is sufficient to form a separate organic phase, heating the mixture to boiling for a few minutes and then distilling of the isoamyl alcohol until the amount of the alcohol is below that required to form the clear aqueous layer.

EGBERT CORNELIS HENDRIK KOLVOORT.

References Cited in the file of this patent

UNITED STATES PATENTS

| Number | Name | Date |
|---|---|---|
| 2,096,609 | Daniel | Oct. 19, 1937 |
| 2,373,347 | Schoenfield | Apr. 10, 1942 |
| 2,538,273 | Rhines | Jan. 6, 1951 |
| 2,567,678 | Morrison | Sept. 11, 1951 |